US008489250B2

(12) United States Patent
Aklilu et al.

(10) Patent No.: US 8,489,250 B2
(45) Date of Patent: Jul. 16, 2013

(54) FAN CONTROL SYSTEM AND METHOD FOR A COMPUTER SYSTEM

(75) Inventors: Ameha Aklilu, Taipei (TW); Charlie C C Chiu, Tanzi Township (TW); Kelvin W P Huang, Zhonghe (TW); Ku-Jei King, Taipei (TW); Edward Y C Kung, Taipei (TW); Bryan M H Pan, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 12/889,747

(22) Filed: Sep. 24, 2010

(65) Prior Publication Data
US 2011/0077796 A1 Mar. 31, 2011

(30) Foreign Application Priority Data

Sep. 30, 2009 (TW) .............................. 98133337 A

(51) Int. Cl.
*F24F 11/04* (2006.01)
*F25B 29/00* (2006.01)
*H02P 7/00* (2006.01)
*H05K 7/20* (2006.01)

(52) U.S. Cl.
USPC ........... 700/300; 700/299; 165/201; 165/244; 318/471; 318/478; 361/679.48; 361/688; 361/695

(58) Field of Classification Search
USPC ........... 700/299, 300; 165/201, 244; 318/471; 361/695, 679.48, 688; 392/356
See application file for complete search history.

(56) References Cited

U.S. PATENT DOCUMENTS

| 5,513,361 | A | 4/1996 | Young |
| 5,777,897 | A * | 7/1998 | Giorgio ......................... 700/299 |
| 5,848,282 | A | 12/1998 | Kang |
| 6,182,232 | B1 | 1/2001 | Klein |
| 6,198,245 | B1 | 3/2001 | Du et al. |
| 6,487,463 | B1 * | 11/2002 | Stepp, III ......................... 700/79 |
| 6,606,251 | B1 | 8/2003 | Kenny, Jr. et al. |
| 6,643,128 | B2 | 11/2003 | Chu et al. |
| 6,735,499 | B2 * | 5/2004 | Ohki et al. ..................... 700/299 |
| 6,873,883 | B2 * | 3/2005 | Ziarnik ......................... 700/300 |
| 7,015,716 | B2 * | 3/2006 | Chen et al. ............... 324/764.01 |
| 7,056,204 | B2 | 6/2006 | Vinson et al. |
| 7,139,169 | B2 * | 11/2006 | Alperin et al. ............. 361/679.4 |
| 7,310,737 | B2 * | 12/2007 | Patel et al. .................... 713/300 |
| 7,310,738 | B2 * | 12/2007 | Bhagwath et al. ............ 713/300 |
| 7,424,806 | B2 * | 9/2008 | Tien et al. ....................... 62/178 |
| 7,495,407 | B2 * | 2/2009 | Huang et al. .................. 318/599 |
| 7,538,509 | B1 * | 5/2009 | Glover et al. ................. 318/481 |

(Continued)

FOREIGN PATENT DOCUMENTS

| JP | 09198166 | 7/1997 |
| TW | I227108 | 1/2005 |
| TW | I235907 | 7/2005 |
| TW | 200602885 | 1/2006 |

*Primary Examiner* — Mohammad Ali
*Assistant Examiner* — Jennifer L Norton
(74) *Attorney, Agent, or Firm* — Lieberman & Brandsdorfer, LLC

(57) ABSTRACT

A fan control system for a computer system is provided. The fan control system includes a power sensor and a controller. The power sensor detects the power dissipated by a target device in the computer system. The controller calculates a suggested airflow speed required for the target device and thus outputs a control signal for controlling a fan within the computer system according to at least the dissipated power.

25 Claims, 2 Drawing Sheets

U.S. PATENT DOCUMENTS

| | | | |
|---|---|---|---|
| 7,708,056 B2 * | 5/2010 | Shen et al. | 165/247 |
| 7,797,080 B2 * | 9/2010 | Durham, III | 700/278 |
| 8,150,561 B2 * | 4/2012 | Shimotono et al. | 700/300 |
| 8,155,922 B2 * | 4/2012 | Loucks | 702/182 |
| 8,253,364 B2 * | 8/2012 | Chen et al. | 318/471 |
| 8,265,799 B2 * | 9/2012 | Eto | 700/300 |
| 2005/0030171 A1 * | 2/2005 | Liu et al. | 340/500 |
| 2005/0188263 A1 * | 8/2005 | Gross et al. | 714/25 |
| 2006/0013571 A1 * | 1/2006 | Squibb | 388/804 |
| 2008/0186670 A1 * | 8/2008 | Lyon et al. | 361/687 |
| 2009/0030554 A1 * | 1/2009 | Bean et al. | 700/276 |
| 2009/0044027 A1 | 2/2009 | Piazza | |
| 2010/0164421 A1 * | 7/2010 | Dishman et al. | 318/478 |
| 2011/0077796 A1 * | 3/2011 | Aklilu et al. | 700/300 |
| 2011/0320061 A1 * | 12/2011 | Chen | 700/300 |
| 2012/0012275 A1 * | 1/2012 | Franz et al. | 165/11.1 |
| 2012/0041614 A1 * | 2/2012 | Chang et al. | 700/300 |
| 2012/0065808 A1 * | 3/2012 | Liu et al. | 700/300 |
| 2012/0143389 A1 * | 6/2012 | Wang | 700/300 |
| 2012/0209449 A1 * | 8/2012 | Alon | 700/300 |
| 2012/0223666 A1 * | 9/2012 | Huang et al. | 318/472 |
| 2012/0265363 A1 * | 10/2012 | Hung et al. | 700/300 |
| 2012/0268051 A1 * | 10/2012 | Wu | 318/472 |

* cited by examiner

FAN CONTROL SYSTEM AND METHOD FOR A COMPUTER SYSTEM

TECHNICAL FIELD

The present invention relates to a fan control system and method for a computer system.

BACKGROUND OF THE INVENTION

Generally, a computer system, for example a personal computer or high-end server, will have a cooling fan installed inside the system for heat dissipation. Particularly, for the existed central processing unit (CPU) or storage device, such as memory or hard disk, due to the increased processing speed and correspondingly the resulted high temperature. It is further required for employing a cooling fan to enhance the effect of heat dissipation to prevent the system damage due to being overheated.

Some prior art employ a thermal diode, or DTS (Digital thermal Sensor), or PECI (Platform Environment Control Interface) provided by Intel Corp. to monitor the temperature of a device (such as CPU) and to control the cooling fan. When the temperature of the device is high, the DTS or PECI will control the fan to provide more airflow. For example, there are the Q-Fan Technology® provided by ASUSTeK Computer Inc., or Precision Cooling Technology®, and QST (Quiet System Technology®) provided by Intel Corp., in which PECI employs the on-die DTS to provide the digital information regarding the temperature of a processor, and QST uses the PECI reading outputted by CPU as feedback to control the fan to make the temperature from a sensor approaching a Tcontrol value.

However, the prior art does not disclose the actual heat dissipation demand considering the operation of a target device, so as to provide sufficient cooling airflow to the target device within an acceptable temperature raising range, and achieve the effect of more energy saving at the same time.

SUMMARY OF INVENTION

In one aspect, a fan control system and method is provided to determine an acceptable temperature raising range, and to prevent the fan from excess operating to achieve energy saving, and also reduce the noise generated by the fan. Another aspect provides a fan control system and method, which considers more full-scale factors to provide sufficient cooling airflow to a target device, such as a CPU, preventing overheated.

In another aspect, a computer system is provided with a target device, a fan for providing airflow to the target device, and a fan control system for controlling the fan. The fan control system further comprises a power sensor and a controller, in which the power sensor is configured for detecting power dissipated by the target device, and the controller generates a control signal for controlling the fan according to the dissipated power. The fan may be a fan controlled by a PWM (Pulse-width modulation) signal. For example, the controller can calculate the suggested airflow speed or associated parameters of the suggested air-flow speed required by the target device, and further generate a control signal.

In yet another aspect, a fan control method for a computer system is provided. The method detects power dissipated by a target device of the computer system and generates a control signal according to at least the dissipated power to control the fan in the computer system, such as activating or stopping the operation of the fan, or adjusting the rotating speed of the fan. For example, the method can calculate the suggested airflow speed or associated parameters of the suggested air-flow speed required by the target device, and further generate a control signal.

In a further aspect, a computer system is provided with a target device, a fan for providing airflow to the target device, and a fan control system for controlling the fan. The fan control system further comprises an ambient temperature sensor and a controller, in which the ambient temperature sensor can detect an ambient temperature where the computer system is located, and the controller can determine a threshold operating temperature of the target device, and control the fan further according a difference between the threshold operating temperature and the ambient temperature.

In a yet further aspect, a fan control method for a computer system is provided for detecting an ambient temperature where the computer system is located, and for controlling the fan in the computer system according to a difference between the threshold operating temperature and the ambient temperature of the target device.

The features, advantages and similar expressions disclosed in this specification do not mean that all the features and advantages realized by the present invention should be within any single embodiment of the present invention. It should be noted that the expressions regarding to the features and advantages indicate those specific features, advantages or characteristics described in connection with embodiments are included in at least one embodiment of the present invention. Therefore, the descriptions regarding to the features, advantages and similar expressions in the specification are related to the similar embodiments, but not necessarily.

These features and advantages can be further understood by referring to the description below and attached claims or using the Detailed Description of the present invention described below.

BRIEF DESCRIPTION OF DRAWINGS

In order to immediately understand the advantages of the present invention, please refer to the specific embodiments shown in the drawings, which describe in details the present invention in a brief description above. It should be noted that these drawings only describe the typical embodiments of the present invention, and should not be considered as limiting the scope of the present invention. The present invention is described by referring to the drawings and additional specifics and details, in which.

DETAILED DESCRIPTION OF PREFERRED EMBODIMENTS

Figure 1:
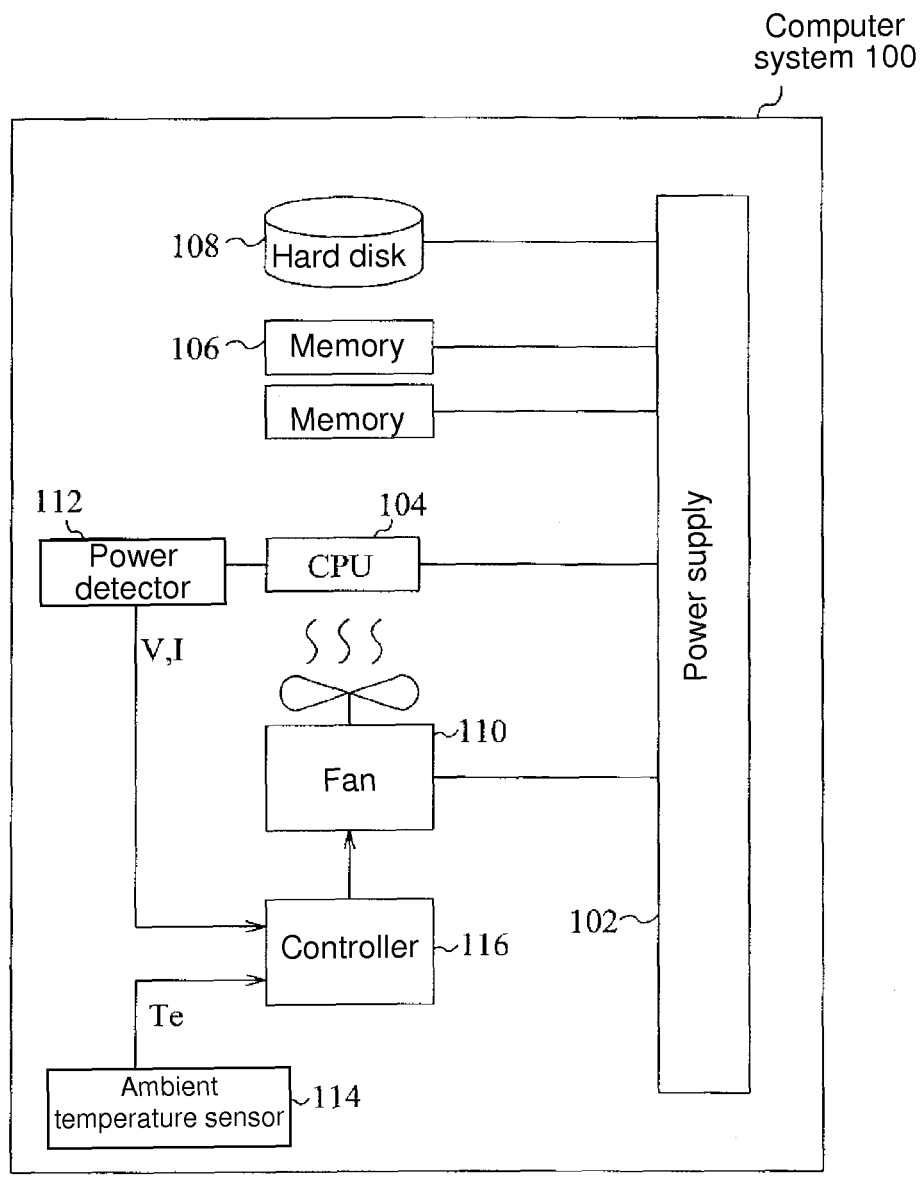
FIG. 1 shows a computer system according an embodiment of the present invention; and, FIG. 2 shows a method flow diagram according to an embodiment of the present invention.

FIG. 1 shows hardware architecture of a computer system (100) in an embodiment, which comprises a power supply (102), a CPU (104), a memory (106), a hard disk (108), a fan (110), a power detector (112), an ambient temperature sensor (114), and a controller (116). Other basic architectures and components for computer system 100 may be referred to an ordinary personal computer or server, such as System X®, Blade Center® or eServer® server from IBM Corp. The details not related to the present invention will be omitted without description.

When a computer system (100) is operating, the power supply (102) provides direct current power to CPU (104), memory (106), hard disk (108), and a fan (110). It should be noted that the memory (106), the hard disk (108) and the fan (110) could be called target devices in the specification, because they will generate a large amount of heat during operating. The purpose of the fan (110) is to cool down these target devices. In an embodiment shown in FIG. 1, only the CPU (104) has a fan (110). But, in other embodiments not shown, the CPU (104), the memory (106), and the hard disk (108) may each have their individual corresponding fan to enhance the efficiency of heat dissipation. In order to clearly describe the present invention, only the CPU (104) and a single fan (110) are used in the description. However, those skilled in the art may replace the CPU (104) with the memory (106), the hard disk (108), or any other target device, which may generate heat and need to be cooled in the computer system.

The fan (110) is preferably a fan using the duty cycle in PWM signal for control, such as the Freezer® fan provided by Arctic Cooling Corp. However, in one embodiment the fan (110) may also be an ordinary direct current fan. Accordingly, the invention should not be limited to the structure of the fan.

The power detector (112) cannot only measure the voltage difference, V, on both ends of CPU (104), but also provide a tiny resistance, such as 0.001 Ohm, for measuring the current, I, of CPU (104). The controller (116) may employ the measured voltage drop, V, and the current, I, to obtain the power dissipated by CPU (104). One skilled in the art may replace the CPU (104) with the memory (106), the hard disk (108) or any other target device in the computer system which will generate heat and need to be cooled, and measure the power actually dissipated by these devices.

The ambient temperature sensor (114) is configured for detecting the temperature, Te, in the operating environment, i.e. room temperature, which is preferably installed outside the computer system (100). The ambient temperature sensor (114) may employ a conventional digital thermal sensor, and directly generate a digital signal corresponding to the detected ambient temperature. It should be noted that the ambient temperature sensor (114) and the CPU (104) should have appropriate distance therebetween to prevent the influence of heat generated by CPU (104) from the ambient temperature sensor (114).

The controller (116) comprises a microprocessor and memory (not shown), preferably integrated in BMC (Baseboard Management Controller) on a motherboard (not shown) of the computer system (100), such as VSC 452 BMC provided by Maxim Corp. or SE-SM4210-P01 BMC provided by ServerEngines Corp. It should be noted that the controller (116) may also be implemented as an independent controller. In the embodiment, the controller (116) has an A/D port (not shown) for receiving the voltage drop, V, and the current, I, detected by the power sensor (112), and thus calculates the power, P, dissipated by CPU (104) (or memory (106), or hard disk (108)). The controller (116) may also have another A/D port (not shown), which can receive the ambient temperature, Te, detected by the ambient temperature sensor (114). Furthermore, the controller (116) may also have a control signal output port for outputting a control signal to the fan (110), and further controlling the activation, stop, or rotating speed of the fan (110).

For example, when the fan (110) is a PWM fan, the controller (116) can output a PWM signal with different duty cycles to control the fan (110). Furthermore, the memory of the controller (116) is stored with the firmware required for controlling the fan, and other associated parameters, such as Specific Heat Capacity/Density of air, sectional area of the CPU (104) facing airflow of fan, threshold operating temperature Tm (Case Temperature) of the CPU (104), or other parameters of the CPU (104).

It should be noted that the threshold operating temperature, Tm, of the CPU (104) is generally provided by the manufacturer, which may be a constant or a function positively correlated to the power dissipated by the CPU (104) (also referred as "thermal profile"). With the CPU example of Kentsfield® (105W TDP) CPU produced by Intel Corp., the threshold operating temperature regulated by Intel Corp. is Tm=0.18P+43.3 (unit in Celsius), wherein P is the power dissipated by CPU (unit in Watts).

The following will further describe how the controller (116) can determine the rotating speed of the fan (110). Typically, when the power dissipated by the CPU (104) is increased, the controller (116) will increase the rotating speed of the fan (110), in which both of them are positively correlated, so as to generate more airflow and enhance the cooling effect. When the difference between the threshold operating temperature and the ambient temperature of the CPU (104) is increased (for example, the computer system (100) is located in a low-temperature environment), the controller (116) will reduce the rotating speed of the fan (110), and even stop the operation of fan (110) for energy saving.

The following will further describe the preferred embodiments of the present invention. First, a nominal state is defined. In this embodiment, an idle state is the nominal state. The ambient temperature, Te, (i.e. room temperature) where the computer system (100) is located is 34.6 C, and the specific heat capacity, Cp, of air in the environment is 1005 J/kg·K, and the density, a, of air in the environment is 1.165 kg/m$^3$. It should be mentioned that the specific heat capacity and density of air may be possibly varied due to the level and temperature of the location, and the controller (116) will employ different specific heat capacities/densities of air correspondingly. Moreover, in one embodiment the CPU (104) is a Kentsfield® (105W TDP) CPU produced by Intel Corp., in which the sectional area, A, of CPU facing airflow of a fan is 0.0034344 m$^2$, and the function for the threshold operating temperature is Tm=0.18P+43.3 (unit in C, wherein the dissipated power, P, is in the unit of Watts. With the power P, if the operating temperature of the CPU (104) is required to be compliant with the requirement of threshold operating temperature, Tm, provided by the manufacturer, the required airflow speed will be determined by the following heat equation:

$$P = M*Cp*(Tm-Te) = (\sigma*v*A)*Cp*(Tm-Te)$$

Wherein v is the required airflow speed, and M is the mass flow rate.

In this example, the CPU (104) is at an idle state, and the controller (116) can obtain the dissipated power $P_{idle}$ is 25.08 W according to the voltage difference, V, and the current, I, of CPU (104) detected by the power sensor (112), so that the threshold operating temperature Tm of CPU is 47.8 C (i.e. 0.18*25.08+43.3). At this time, referring to the threshold operating temperature, the fan controlled by adjusting the duty cycle in a PWM signal can be compliant with the thermal profile requirement of the CPU. In this example, the duty cycle is 35%, and the operating temperature will not exceed the threshold temperature Tm (i.e. 47.8 C) for the dissipated power.

Thus, the controller (116) can refer to the threshold operating temperature, and obtain a suggested airflow speed, $v_{idle}$, for an idle state based on the above-mentioned heat equation and the formula below, wherein α is a geometric adjustment parameter obtained by empirical and experience.

$$v_{idle} = (P_{idle} * \alpha)/(Cp * A * \sigma * (Tm - Te)) =$$
$$25.08\alpha/(1.165 * 0.0034344 * 1005 * (47.8 - 34.6)) = 0.473\alpha$$

When the power of the CPU (104) is increased (for example, the dissipated power $P_1$ is 53.91 W), Tm is 53 C (i.e. 0.18*53.91+43.3).

Thus, the controller (116) can obtain a suggested airflow speed, $v_1$, based on the formula below, wherein α is the same geometric adjustment parameter.

$$v_1 = (P_1 * \alpha)/(Cp * A * \sigma * (Tm - Te)) =$$
$$53.91\alpha/(1.165 * 0.0034344 * 1005 * (53 - 34.6)) = 0.729\alpha$$

Because different dissipated powers all have the same geometric adjustment parameter, the duty cycle for a PWM signal under different dissipated powers may be adjusted relative to the duty cycle under idle state (35%) in proportion using an extrapolation method. According to an embodiment of the present invention, an adjustment factor F(factor)=v/vi$_{dle}$ relative to an idle state is first obtained. In this example, the adjustment factor $F_1$ is calculated as follows:

$$F_1 = v_1/v_{idle} = 0.729\alpha/0.473\alpha = 1.54$$

Next, the controller (116) will adjust the factor $F_1$ relative to the duty cycle under idle state (35%) in proportion, and obtain the duty cycle under the dissipated power. In this example, the duty cycle for the corresponding PWM signal is 53.9% (i.e. 35%*$F_1$=35%*1.54), and outputting to the fan (110) for controlling the rotating speed of fan (110). The table 1 below lists out the corresponding duty cycles obtained by extrapolation method for the adjusting factor under other dissipated powers.

TABLE 1

| State | Dissipated power(P) | Airflow speed(v) | Adjusting factor(F) | PWM duty cycle(%) |
|---|---|---|---|---|
| Idle | 25.08 (Idle) | 0.473 | 1 | 35 |
| 1 | 53.91 | 0.729 | 1.54 | 53.9 |
| 2 | 55.49 | 0.738 | 1.56 | 54.6 |
| 3 | 56.16 | 0.742 | 1.57 | 54.9 |
| 4 | 62.59 | 0.779 | 1.65 | 57.6 |
| 5 | 73.73 | 0.835 | 1.76 | 61.78 |
| 6 | 74.78 | 0.839 | 1.77 | 62.08 |
| 7 | 76.7 | 0.847 | 1.79 | 62.67 |
| 8 | 82.37 | 0.871 | 1.84 | 64.45 |

Figure 2:
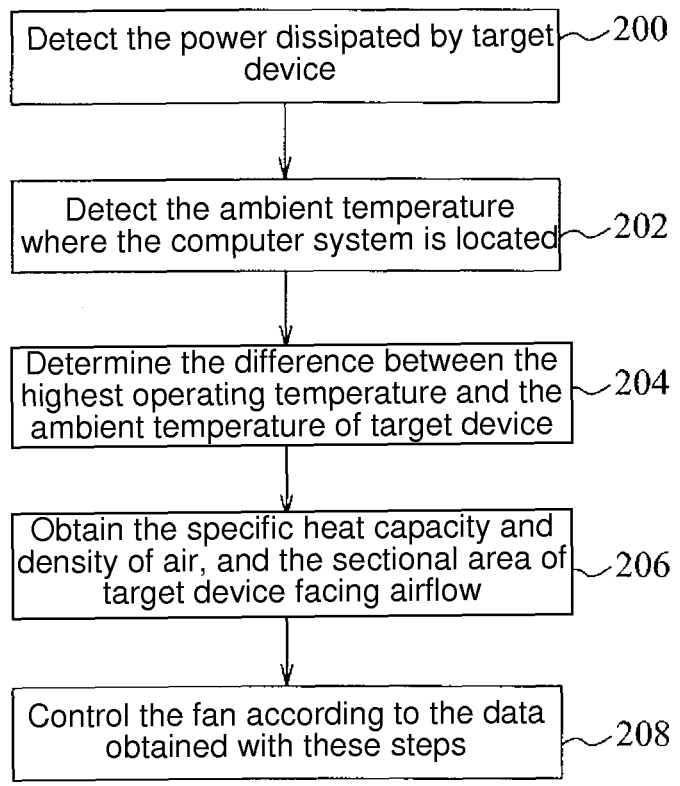

FIG. 2 shows a flow diagram for a fan control method of the present invention, which describes the present invention in connection with FIG. 1. In Step (200), the power detector (112) detects the current and voltage drop of the CPU (104) (or target devices, such as memory (106) or hard disk (108)) for the controller (116) to calculate the power dissipated by the CPU (104). In Step (202), the ambient temperature sensor (114) detects the ambient temperature where the computer system (100) is located. In Step (204), a difference between the threshold operating temperature and the ambient temperature of CPU (104) is determined, wherein the threshold operating temperature may be a constant or a power-related function. In Step (206), the specific heat capacity and density of air are obtained, together with the sectional area of CPU (104) facing airflow. In Step (208), the controller (116) can obtain the above-mentioned airflow speed, v, and the adjusting factor, F. according to the dissipated power (P), ambient temperature (Te), and other data obtained in the above-mentioned steps, and further determine the duty cycle in the corresponding PWM signal, and output it to the fan (110). It should be clarified that the Physics unit for suggested airflow speed, v, is not critical to the application of the present invention. One skilled in the art may change the suggested airflow speed, v, as an airflow speed related parameters with different Physics quantities according to the above-mentioned deduction, and still obtain the same adjusting factor, F.

In the above embodiments, the PWM duty cycle, i.e. the rotating speed of the fan (110), is positively correlated with the power of the CPU (104), but is negatively correlated with the density and specific heat capacity of air, the sectional area of CPU facing airflow, and the difference between the threshold operating temperature and the ambient temperature. In summary for these various parameters, the fan (110) can prevent exceeding operation, achieve energy saving, reduce the noise from the fan, and also ensure the CPU (104) will not overheat. For the CPUs produced by Intel Corp., such as Kentsfield (105W TDP), the PWF duty cycle can be associated with the reading of PECI (Platform Environment Control Interface) and Tcontrol value outputted by CPU, and have further fine-tuning from the empirical results. In this example, when Tcontrol value is −16 and under any dissipated power of CPU, if the PWM duty cycle is reduced by an offset, such as 10, PECI reading will not exceed Tcontrol reading, i.e. the absolute value of the PECI reading is not less than 16. Under such a situation, the PWM duty cycle under any dissipated power of CPU can be directly reduced by the offset further from the obtained PWM duty cycle as previously described as the PWM duty cycle outputted to the fan, so as to achieve further effect of energy saving within an allowable operating range.

The above-mentioned CPU (104), memory (106), and hard disk (108) may have individually corresponding fans (110) to enhance the efficiency of heat dissipation. The skilled in the art can apply the embodiment of fan control method for CPU (104) for the corresponding fans of the memory (106), hard disk (108) or other target devices in the computer system which will generate heat and need to be cooled.

The present invention can be implemented with other specific form without departing from the spirit of the present invention or required features. The descriptions for said embodiments may only be treated by all means as explanatory, but not as limitation. Thus, the scope of the present invention is defined by the attached claims, but not by the above description. All the equivalent meanings falling within the claims and variations within the scope shall be construed as falling within the scope of the claims.

We claim:

1. A fan control system for a computer system, said computer system comprising a fan for providing airflow to a target device of said computer system, said fan control system comprising:
   a power sensor for detecting power dissipated by said target device; and
   a controller for generating a control signal for controlling said fan according to said dissipated power, wherein a rotating speed of the fan is positively correlated with the power dissipated by the target device, and negatively correlated with a density and a heat capacity of air, a sectional area of the target device facing airflow, and a difference between a threshold operating temperature and an ambient temperature, wherein a pulse-width modulation (PWM) duty cycle of the fan corresponding to the power dissipated by the target device is adjusted relative to the PWM duty cycle in an idle state by an adjustment factor, the adjustment factor being a quotient of an airflow speed in a current state and an airflow speed in the idle state.

2. The fan control system of claim 1, wherein said controller calculates a suggested airflow speed required by said target device, and further generates a control signal.

3. The fan control system of claim 2, further comprising: an ambient temperature sensor to detect an ambient temperature where said computer system is located; wherein said controller controls said fan according to said detected ambient temperature.

4. The fan control system of claim 3, wherein said controller determines a threshold operating temperature for said target device, and said controller controls said fan further according to a difference between said threshold operating temperature and said ambient temperature.

5. The fan control system of claim 4, wherein said controller determines said threshold operating temperature according to said detected dissipated power.

6. The fan control system of claim 4, wherein said controller controls said fan according to an element selected from the group consisting of: specific heat capacity and density of air.

7. The fan control system of claim 1, wherein said control signal is a pulse-width modulation (PWM) signal.

8. A computer system, comprising:
a target device;
a fan to provide airflow to said target device; and
a fan control system, said fan control system comprising:
a power sensor to detect power dissipated by said target device, and a controller to generate a control signal to control said fan according to said dissipated power, wherein a rotating speed of the fan is positively correlated with the power dissipated by the target device, and negatively correlated with a density and a heat capacity of air, a sectional area of the target device facing airflow, and a difference between a threshold operating temperature and an ambient temperature, wherein a pulse-width modulation (PWM) duty cycle of the fan corresponding to the power dissipated by the target device is adjusted relative to the PWM duty cycle in an idle state by an adjustment factor, the adjustment factor being a quotient of an airflow speed in a current state and an airflow speed in the idle state.

9. The computer system of claim 8, wherein said controller calculates a suggested airflow speed required by said target device, and further generates said control signal.

10. The computer system of claim 9, wherein said fan control system further comprises: an ambient temperature sensor to detect an ambient temperature where said computer system is located; wherein said controller controls said fan further according to said detected ambient temperature.

11. The computer system of claim 10, wherein said controller determines a threshold operating temperature for said target device, and said controller controls said fan further according to a difference between said threshold operating temperature and said ambient temperature.

12. The computer system of claim 11, wherein said controller determines said threshold operating temperature according to said dissipated power.

13. The computer system of claim 8, wherein said control signal is a pulse-width modulation (PWM) signal.

14. The computer system of claim 8, wherein said target device is a central processing unit (CPU).

15. The computer system of claim 8, further comprising a Baseboard Management Controller (BMC), wherein said controller of said fan control system is integrated in said BMC.

16. A fan controlling method for a computer system, said computer system comprising a fan for providing airflow to a target device of said computer system, said method comprising:
detecting power dissipated by said target device; and
generating a control signal to control said fan according to said dissipated power, wherein a rotating speed of the fan is positively correlated with the power dissipated by the target device, and negatively correlated with a density and a heat capacity of air, a sectional area of the target device facing airflow, and a difference between a threshold operating temperature and an ambient temperature, wherein a pulse-width modulation (PWM) duty cycle of the fan corresponding to the power dissipated by the target device is adjusted relative to the PWM duty cycle in an idle state by an adjustment factor, the adjustment factor being a quotient of an airflow speed in a current state and an airflow speed in the idle state.

17. The method of claim 16, wherein the step of generating a control signal to control said fan includes calculating a suggested airflow speed required by said target device to generate said control signal.

18. The method of claim 17, further comprising: detecting an ambient temperature where said computer system is located; wherein the step of generating a control signal to control said fan includes controlling said fan according to said detected ambient temperature.

19. The method of claim 18, wherein the step of generating a control signal to control said fan includes controlling said fan further according to a difference between a threshold operating temperature for said target device and said ambient temperature of said target device.

20. The method of claim 19, wherein the step of generating a control signal to control said fan includes determining said threshold operating temperature according to said dissipated power by said target device.

21. The method of claim 18, wherein the step of generating a control signal to control said fan includes controlling said fan according to a property selected from the group consisting of: specific heat capacity and density of air.

22. The method of claim 18, wherein the step of generating a control signal to control said fan includes controlling said fan according to a sectional area of said target device facing said airflow.

23. The method of claim 16, wherein said control signal is a PWM signal.

24. The method of claim 16, wherein the step of generating a control signal to control said fan includes adjusting the rotating speed of said fan.

25. A computer system, comprising:
a target device; a fan to provide airflow to said target device; and
a fan control system, said fan control system comprising:
an ambient temperature sensor to detect an ambient temperature where said computer system is located; and
a controller to determine a threshold operating temperature for said target device, and further controlling said fan, wherein a rotating speed of the fan is positively correlated with the power dissipated by the target device, and negatively correlated with a density and a heat capacity of air, a sectional area of the target device facing airflow, and a difference between a threshold operating temperature and an ambient temperature, wherein a pulse-width modulation (PWM) duty cycle of the fan corresponding to the power dissipated by the target device is adjusted relative to the PWM duty cycle in an idle state by an adjustment factor, the adjustment factor being a quotient of an airflow speed in a current state and an airflow speed in the idle state.

* * * * *